United States Patent
Hiraoka et al.

(10) Patent No.: US 8,096,912 B2
(45) Date of Patent: Jan. 17, 2012

(54) SPEED CHANGE TRANSMISSION DEVICE

(75) Inventors: Minoru Hiraoka, Osakasayama (JP); Shoso Ishimori, Sakai (JP); Yoshiyuki Katayama, Osaka (JP)

(73) Assignee: Kubota Corporation, Osaka (JP)

( * ) Notice: Subject to any disclaimer, the term of this patent is extended or adjusted under 35 U.S.C. 154(b) by 753 days.

(21) Appl. No.: 12/065,820

(22) PCT Filed: Sep. 25, 2006

(86) PCT No.: PCT/JP2006/318940
§ 371 (c)(1),
(2), (4) Date: Aug. 20, 2008

(87) PCT Pub. No.: WO2007/040077
PCT Pub. Date: Apr. 12, 2007

(65) Prior Publication Data
US 2009/0149292 A1    Jun. 11, 2009

(30) Foreign Application Priority Data
Sep. 30, 2005    (JP) .................................. 2005-286073

(51) Int. Cl.
*F16H 37/02*    (2006.01)
(52) U.S. Cl. .......................... 475/208; 475/209; 475/218
(58) Field of Classification Search .................. 475/208, 475/209, 215
See application file for complete search history.

(56) References Cited

U.S. PATENT DOCUMENTS
| | | | |
|---|---|---|---|
| 3,988,949 A | 11/1976 | Weseloh et al. | |
| 5,269,732 A | 12/1993 | Weiss et al. | |
| 5,911,645 A | 6/1999 | Wontner et al. | |
| 7,267,630 B2 | 9/2007 | Tabata et al. | |
| 2002/0094904 A1* | 7/2002 | Kuramoto et al. | 475/207 |
| 2003/0109347 A1* | 6/2003 | Weeramantry | 475/72 |

FOREIGN PATENT DOCUMENTS
| | | |
|---|---|---|
| JP | 51-008458 A | 1/1976 |
| JP | 63135049 A | 9/1988 |
| JP | 2004-270762 A | 9/2004 |
| JP | 2005-127497 A | 5/2005 |

\* cited by examiner

*Primary Examiner* — Edwin A Young
(74) *Attorney, Agent, or Firm* — The Webb Law Firm

(57) ABSTRACT

The object is to simplify the construction of a speed change apparatus in which an engine drive force is speed-changed in a plurality of speed ranges and speed-changed steplessly in each speed range, with using a stepless speed change device (10), planetary transmission mechanisms (P1, P2, P3) and clutches (C1, C2).

There is provided a main speed change device (B) configured to combine an output from the stepless speed change device (10) and the drive force from the engine trough the first, second and third planetary transmission mechanisms (P1, P2, P3) and then output the resultant combined force from an output shaft (41). There is provided an auxiliary speed change device (20) for effecting speed change on the drive force from the output shaft (41) of the main speed change device (B) and then outputting the speed-changed force.

6 Claims, 6 Drawing Sheets

Fig. 6

| | | main speed change device | | auxiliary speed change device | |
|---|---|---|---|---|---|
| | | first clutch C1 | second clutch C2 | low speed clutch CL | high speed clutch CH |
| low speed mode | first speed range | ENGAGED | — | ENGAGED | — |
| | second speed range | — | ENGAGED | ENGAGED | — |
| high speed mode | first speed range | ENGAGED | — | — | ENGAGED |
| | second speed range | — | ENGAGED | — | ENGAGED |
| multiple stage mode | first speed range | ENGAGED | — | ENGAGED | — |
| | second speed range | — | ENGAGED | ENGAGED | — |
| | third speed range | ENGAGED | — | — | ENGAGED |
| | fourth speed range | — | ENGAGED | — | ENGAGED |

SPEED CHANGE TRANSMISSION DEVICE

TECHNICAL FIELD

The present invention relates to a speed change transmission apparatus, more particularly, to a speed change transmission apparatus operable to effect speed change operations on a drive force from an engine, with using a stepless speed change device, a planetary transmission mechanism and a clutch.

BACKGROUND ART

As an example of a speed change transmission apparatus operable to effect speed change operations on a drive force from an engine, with using a stepless speed change device, a planetary transmission mechanism and a clutch, there is one known from Patent Document 1.

The speed change transmission apparatus disclosed in Patent Document 1 includes: a hydraulic unit 4 receiving drive force from an engine 1 via a first gearwheel transmission 3; and a summator planetary gear 10 operable to receive an output from the hydraulic unit 4 via a second gearwheel transmission 5 and a first input shaft 6 and operable also to receive directly the drive force from the engine 1 not via the hydraulic unit 4, but via a third gearwheel transmission 7 and a second input shaft 8. The apparatus further includes: a first planetary gearstep 12 and a second planetary gearstep 13 which receive force from the summator planetary gear 10 via clutches K1, K2; and an output shaft 14 coupled to a planetary carrier shift 25 and coupled to either the planetary carrier shaft 25 or a sun wheel shaft 30 via clutches K3, K4. The summator planetary gear 10 includes a first planetary line including a first sun wheel 20 and a second planetary line including a second sun wheel 23. The first planetary gearstep 12 includes a clutch KR and the second gearstep 13 includes a clutch KV. With a speed change operation effected on the hydraulic unit 14 and subsequent appropriate operations of the respective clutches KV, KR, K1, K2, K3, K4, the engine drive force is changed in four speed steps and is changed steplessly in each speed step.

Patent Document 1: U.S. Pat. No. 5,911,645 (columns 3-6, FIGS. 1-3).

When the above-described conventional speed change apparatus is employed, it is necessary to provide great numbers of planetary transmission mechanisms and clutches, thus tending to invite disadvantage in terms of construction.

DISCLOSURE OF THE INVENTION

The object of the present invention is to provide a speed change transmission apparatus, though utilizing a stepless speed change device, a planetary mechanism and a clutch, is capable of speed change operations in a plurality of speed ranges as well as stepless speed change operation in each speed range, with providing advantage in terms of construction and providing also easy change in the mode of speed change operations.

In accordance with the first invention, a speed change transmission apparatus comprises: a main speed change device, said main speed change device including; a stepless speed change device receiving a drive force from an engine; a planetary transmission section including a plurality of planetary transmission mechanisms, said planetary transmission section being configured to combine an output from said stepless speed change device and drive force from the engine not subjected to a speed change action by said stepless speed change device; a clutch section receiving force from said planetary transmission section and including a first clutch and a second clutch; and an output shaft operatively coupled to said clutch section, wherein, in response to a speed change operation on said stepless speed change device and to a switchover operation of each of said clutches between an engaged condition and a disengaged condition, said main speed change device outputs, from said output shaft, an output with a rotational speed corresponding to a speed change state of said stepless speed change device and operational conditions of said respective clutch. In addition, an auxiliary speed change device is provided that changes speed of the drive force from said output shaft of said main speed change device and that outputs the resultant speed-changed drive force.

That is, in an embodiment, as the auxiliary speed change device, there is employed an auxiliary speed change device capable of speed change in two steps of high speed and low speed. Then, if the stepless speed change device is operated for a speed change operation with fixing this auxiliary speed change device under the low speed condition or the high speed condition, there are realized relationships between speed change conditions of the stepless speed change device and output speeds from the auxiliary speed change device, as illustrated in FIG. 4. The relationship shown with solid lines in FIG. 4 is the relationship realized when the auxiliary speed change device is fixed under the low speed condition. The relationship shown with broken lines in FIG. 4 is the relationship realized when the auxiliary speed change device is fixed under the high speed condition. For each condition of the auxiliary speed change device, there are provided two speed ranges. And, in each speed range, the speed is changed steplessly. The output speed in each speed range when the auxiliary speed change device is fixed under the high speed condition will be higher than the output speed when the auxiliary speed change device is fixed under the low speed condition.

Further, if, as the auxiliary speed change device, there is employed an auxiliary speed change device capable of speed change in two steps of high speed and low speed and this auxiliary speed change device is operated for speed change at an intermediate portion of the speed change range of the stepless speed change device, there is realized the relationship between the speed conditions of the stepless speed change device and the output speeds of the auxiliary speed change device as illustrated in FIG. 5. That is, there are provided four ranges and at each speed range, the speed will be changed in a stepless manner.

Therefore, according to this first invention, as the output from the stepless speed change device and the engine drive force not affected by the stepless speed change action by the stepless speed change device are combined at the planetary transmission section, there is realized efficient power transmission. Further, while allowing the force transmission in a plurality of speed ranges and stepless speed change at each speed range, this construction is yet provided with a plurality of planetary transmission mechanisms. At the same time, as the construction requires only two clutches in the clutch section, it can be simple and can be obtained inexpensively.

Further, by utilizing the auxiliary speed change device appropriately, by e.g. fixing this auxiliary speed change device under a predetermined speed change condition or causing this device to effect speed change operation in operative association with a speed change operation by the stepless speed change device, the construction allows speed change operations in different speed ranges, speed change operations with same speed stage in the speed range, but with different output speed corresponding to the speed change position at each speed range. Hence, the construction can be utilized advantageously so as to obtain an output speed appropriate for drive load.

According to a second invention, in the construction of the first invention;

the main speed change device further includes a transmission cylinder shaft with a transmission shaft extending within said transmission cylinder shaft such that the transmission cylinder shaft is rotatable with respect to the transmission shaft, said transmission shaft transmitting the engine drive force not subjected to the speed change action by the stepless speed change device to said planetary transmission section; wherein said transmission cylinder shaft supports a sun gear of a planetary transmission mechanism arranged on a transmission downstream side of the planetary transmission section and an input side rotational member of said second clutch so that said sun gear and said input side rotational member are rotatable with the transmission cylinder shaft;

an input side rotational member of said first clutch and the input side rotational member of said second clutch are rotatably supported to said transmission cylindrical shaft and juxtaposed along an axis of said transmission shaft; and a coupling member for operatively coupling a ring gear of the planetary transmission mechanism on the transmission downstream side of the planetary transmission section to the input side rotational member of the first clutch is disposed between said first clutch and said planetary transmission section.

When the first clutch or the second clutch is provided as a hydraulic clutch so as to be switched over by a hydraulic piston incorporated within the clutch, as the outer diameter of the clutch increases, a centrifugal force generated therefrom will provide a greater effect on the hydraulic fluid, thus rendering the switchover operation of the clutch less smooth.

According to the construction of the second invention, even if the first and second clutches are disposed serially along the axis of the transmission shaft, as the transmission member operatively couples the input side rotational member of the first clutch to the ring gear of the planetary transmission mechanism arranged on the transmission downstream side of the planetary transmission section and the transmission cylindrical shaft operatively couples the input side rotational member of the second clutch to the sun gear of the planetary transmission mechanism arranged on the transmission downstream side of the planetary transmission section, the stepless speed change device and the respective clutches are operated appropriately so that the engine drive force will be speed changed and outputted from the output shaft. In this way, the combined drive force from the planetary transmission section can be operatively coupled to the clutch section.

Therefore, according to the second invention, even if the first clutch and the second clutch are juxtaposed in series in the direction along the axis of the transmission shaft so as to render the centrifugal force generated in each clutch uniform or substantially uniform and the outer diameter of each clutch is set same or substantially same and minimized so as to minimize the centrifugal force and each clutch is constructed as a hydraulic clutch, the construction can restrict occurrence of the trouble due to the centrifugal force such as increased resistance in the switchover operation due to the centrifugal force for a certain clutch, thus allowing smooth speed change operations.

According to a third invention, in the construction of the second invention, there is provided an output transmission rotational member having said transmission shaft extending therethrough such that output transmission rotational member is rotatable with respect to said transmission shaft; wherein an output side rotational member of said first clutch and an output side rotational member of said second clutch are formed integral with each other; and there is provided a transmission member having one end portion thereof retained to a retaining coupling portion of the output side rotational member of the second clutch to be rotatable therewith and having the other end portion thereof operatively coupled to said transmission rotational member, thereby operatively coupling the output side rotational members of the first and second clutches to said transmission rotational member.

That is to say, while the output side rotational member of the first clutch and the output side rotational member of the second clutch are formed integral with each other, the output side rotational members and the transmission member are separated from each other at the retaining coupling portion. Hence, even when the first and second clutches and the transmission member are assembled separately with the transmission cylinder shaft and the transmission rotational member, under the condition of completion of the assembly of the first and second clutches and the transmission member to the transmission cylinder shaft, there can be obtained the assembled condition with the output side rotational members of the first and second clutches being operatively coupled to the transmission rotational member as the output side rotational member and the transmission member are retained to each other at the retaining coupling portion.

Therefore, according to the third invention, the construction can be obtained at low costs by making the output side rotational members of the first and second clutches integral with each other. At the same time, by adopting the assembly method of assembling the first and second clutches and the transmission member separately to the transmission shaft, the assembly operation can be carried out easily and efficiently.

According to a fourth invention, in the construction of any one of the first through third inventions, with a speed change operation of the stepless speed change device, a switchover operation of the first and second clutches and a speed change operation of the auxiliary speed change device, there are provided four speed ranges and wherein the auxiliary speed change device outputs an output which is continuous between the speed ranges and is speed-changed steplessly in each speed range.

That is, with appropriate manual or automatic switchover operations of the first and second clutches and the auxiliary speed change device in association with a speed change operation of the stepless speed change device, the drive force from the engine is provided in fourth separate stages of speed range and also in each speed range, an output which is steplessly speed-changed will be outputted from the auxiliary speed change device.

Therefore, according to the fourth invention, the engine drive force will be steplessly speed-changed over a wide speed change range and outputted as such. Hence, even when the drive load varies over a wide range, an appropriate high speed or high torque output suitable for the drive load can be realized and utilized advantageously.

BRIEF DESCRIPTION OF THE DRAWINGS

FIG. 6 is an explanatory view illustrating relationship between speed ranges and operational conditions of respective clutches.

BEST MODE FOR CARRYING OUT THE INVENTION

Next, an embodiment of the present invention will be described with reference to the accompanying drawings.

Figure 1:
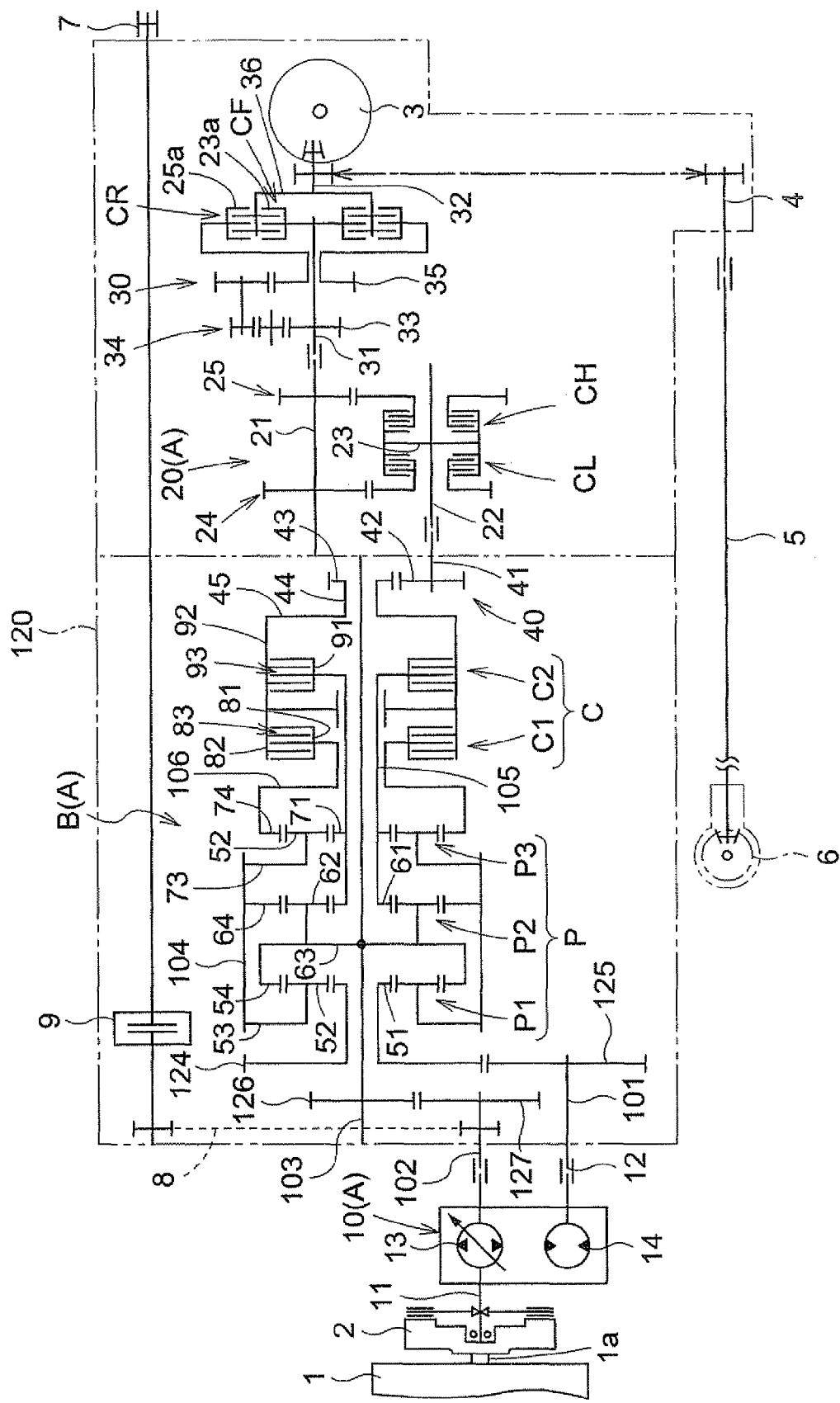
FIG. 1 is a diagram of a traveling transmission apparatus for a tractor.

As shown in FIG. 1, an engine drive force outputted from an output shaft 1a of an engine 1 is inputted via a main clutch 2 to a pump shaft 11 functioning as an input shaft of a speed change transmission apparatus A. An output from an output shaft 21 of this speed change transmission apparatus A is transmitted to an input shaft 31 of a forward/reverse switchover device 30 and an output from an output shaft 32 of this forward/reverse switchover device 30 is transmitted via a front wheel PTO (power takeoff shaft 4 and a transmission shaft 5 to a front wheel differential mechanism 6. In this way, a traveling transmission apparatus for a tractor is constructed.

Incidentally, a numeral 7 shown in FIG. 1 is a component for transmitting the engine drive force to various work implements such as a rotary plow operatively connected to the tractor. This power takeoff shaft 7 (PTO shaft) receives the drive force from the engine 1 from the pump shaft 11 via a gear transmission mechanism 8 and an implement clutch 9.

As shown in FIG. 1, the speed change transmission apparatus A includes a continuously variable or a stepless speed change device 10 having the pump shaft 11, a main speed change device B receiving the drive forces from the pump shaft 11 of this stepless speed change device 10 and from a motor shaft 12, and an auxiliary speed change device 20 receiving the drive force from this main speed change device B and having the output shaft 21.

The stepless speed change device 10 comprises a hydrostatic stepless speed change device which includes a variable displacement, axial plunger type hydraulic pump 13 having the pump shaft 11 and an axial plunger type hydraulic motor 14 having the motor shaft 12.

Therefore, with this stepless speed change device 10 in operation, in response to a change in the swash plate slope of the hydraulic pump 13, the device 10 will be switched over into one of a forward rotation transmission condition where the drive force from the engine 1 is converted into a drive force in the forward rotation direction and speed-changed steplessly and outputted from the motor shaft 12, a reverse rotation transmission condition where the drive force from the engine 1 is converted into a drive force in the reverse rotation direction and speed-changed steplessly and outputted from the motor shaft 12 and a neutral condition where the drive of the hydraulic motor 14 is stopped, thereby stopping any output from the motor shaft 12.

As shown in FIG. 1, the main speed change device B includes: a planetary transmission section P which receives the drive forces from the pump shaft 11 and the motor shaft 12 of the stepless speed change device 10 and has a first planetary transmission mechanism P1, a second planetary transmission mechanism P2 and a third planetary transmission mechanism P3; a clutch section C which receives force from the planetary transmission section and has a first clutch C1 and a second clutch C2; and an output transmission mechanism 40 having an output shaft 41 operatively coupled to the clutch section C. The first planetary transmission mechanism P1, the second planetary transmission mechanism P2 and the third planetary transmission mechanism P3 are arranged such that the first planetary transmission mechanism P1 is positioned on the most upstream side in the transmission direction of the planetary transmission section P and the third planetary transmission mechanism PS is positioned on the most downstream side in the transmission direction of the planetary transmission section P.

Figure 2:
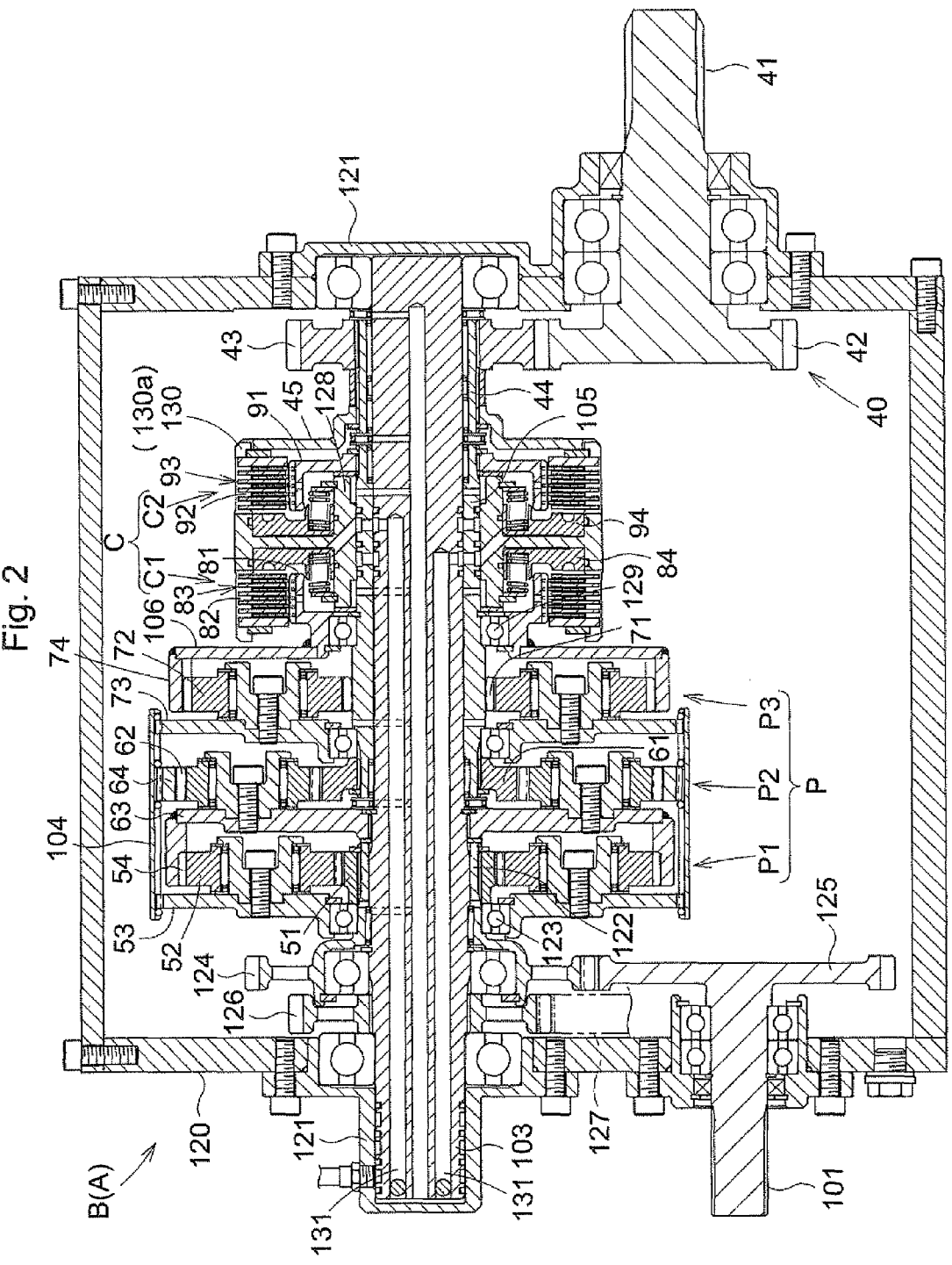
FIG. 2 is a section view of a planetary transmission section, a clutch section.

As may be clearly shown in FIG. 2, the first planetary transmission mechanism P1 of the planetary transmission section P includes a sun gear 51, a plurality of planet gears 52 distributed around the sun gear 51, a carrier 53 for supporting the respective planet gears 52 to be rotatable about their own axes, and a ring gear 54 meshing with the respective planet gears 52. The output from the motor shaft 12 of the stepless speed change device 10 is inputted via e.g. a first input shaft 101, to the sun gear 51 of this first planetary transmission mechanism P1. As shown in FIG. 1, the drive force taken off by a second input shaft 102 from the pump shaft 11 of the stepless speed change device 10 is inputted via e.g. a transmission shaft 103, to the ring gear 54 of this first planetary transmission mechanism P1.

As may be clearly shown in FIG. 2, the second planetary transmission mechanism P1 of the planetary transmission section P includes a sun gear 61, a plurality of planet gears 62 distributed around the sun gear 61, a carrier 63 for supporting the respective planet gears 62 to be rotatable about their own axes, and a ring gear 64 meshing with the respective planet gears 62. As shown in FIG. 1, the drive force taken off by the second input shaft 102 from the pump shaft 11 of the stepless speed change device 10 is inputted via e.g. the transmission shaft 103, to the carrier 63 of this second planetary transmission mechanism P2.

As may be clearly shown in FIG. 2, the third planetary transmission mechanism P3 of the planetary transmission section P includes a sun gear 71, a plurality of planet gears 72 distributed around the sun gear 71, a carrier 73 for supporting the respective planet gears 72 to be rotatable about their own axes, and a ring gear 74 meshing with the respective planet gears 72.

As may be shown clearly in FIG. 2, the carrier 53 of the first planetary transmission mechanism P1, the ring gear 64 of the second planetary transmission mechanism P2 and the carrier 73 of the third planetary transmission mechanism PS are coupled to each other to be rotatable in unison by means of a cylindrical coupling member 104 engaged with the outer peripheral sides of the respective carriers 53, 73 and the ring gear 64. The ring gear 54 of the first planetary transmission mechanism P1 and the carrier 63 of the second planetary transmission mechanism P2 are coupled to each other to be rotatable together. The sun gear 61 of the second planetary transmission mechanism P2 is supported to an end of a transmission cylinder shaft 105 via spline engagement to be rotatable therewith. The sun gear 71 of the third planetary transmission mechanism P3 is formed integral with an intermediate portion of the transmission cylinder shaft 105 and the sun gear 61 of the second planetary transmission mechanism P2 and the sun gear 71 of the third planetary transmission mechanism PS are coupled to be rotatable in unison by the transmision cylinder shaft 105.

As may be clearly shown in FIG. 2, the first clutch C1 of the clutch section C includes a cylindrical input side rotational member 81 operatively coupled via a disc-like coupling member 106 to the ring gear 74 of the third planetary transmission mechanism PS, a cylindrical output side rotational member 82 disposed on the outer peripheral side of this input side rotational member 81, and a multiple-disc type friction clutch mechanism 83 interposed between the input side rotational member 81 and the output side rotational member 82. With the above, in response to an engaging or disengaging operation of the friction clutch mechanism 83, the first clutch C1 will be switched over between an engaged condition wherein the friction clutch mechanism 83 establishes frictionally operable and co-rotational coupling between the input side rotational member 81 and the output side rotational member 82 so as to allow co-rotation of the ring gear 74 of the third planetary transmission mechanism PS with the output side rotational member 82 and a disengaged condition wherein the operable coupling between the input side rotational member 81 and the output side rotational member 82 is broken so as to allow relative rotation of the ring gear 74 of the third planetary transmission mechanism PS relative to the output side rotational member 82.

As may be clearly shown in FIG. 2, the second clutch C2 of the clutch section C includes a cylindrical input side rotational member 91 operatively coupled via the coupling cylinder shaft 105 to the sun gears 61, 71 of the second planetary transmission mechanism P2 and the third planetary transmission mechanism P3 to be rotatable in unison therewith, a cylindrical output side rotational member 92 disposed on the outer peripheral side of this input side rotational member 91, and a multiple-disc type friction clutch mechanism 93 interposed between the input side rotational member 91 and the output side rotational member 92. With the above, in response to an engaging or disengaging operation of the friction clutch mechanism 93, the second clutch C2 will be switched over between an engaged condition wherein the friction clutch mechanism 93 establishes frictionally operable and co-rotational coupling between the input side rotational member 91 and the output side rotational member 92 so as to allow co-rotation of the sun gears 61, 71 of the second planetary transmission mechanism P2 and the third planetary transmission mechanism P3 with the output side rotational member 92 and a disengaged condition wherein the operable coupling between the input side rotational member 91 and the output side rotational member 92 is broken so as to allow relative rotation of the sun gears 61, 71 of the second planetary transmission mechanism P2 and the third planetary transmission mechanism PS relative to the output side rotational member 92.

The output shaft 41 is operatively coupled to the output side rotational member 92 of the second clutch C2 via a transmission gear 42 mounted on this output shaft 41 to be rotatable therewith, a transmission gear 43 meshing with this transmission gear 42, a cylindrical transmission rotational member 44 to whose one end portion the transmission gear 43 is splined to be rotatable therewith, and a disc-like transmission member 45 splined to the other end of the transmission rotational member 44 to be rotatable therewith. The output side rotational member 92 of the second clutch C2 is formed integral with the output side rotational member 82 of the first clutch C1 and the output shaft 41 is coupled also to the output side rotational member 82 of the first clutch C1.

With the main speed change device B having the above-described construction in operation, the force from the engine 1 is inputted to the pump shaft 11 of the stepless speed change device 10 and converted by this stepless speed change device 10 into a drive force of forward rotational direction or a reverse rotational direction and at the same time, in either the forward or reverse rotational direction, the force is speed-changed steplessly and the resultant force outputted from the motor shaft 12 is inputted via e.g. the first input shaft 101 to the sun gear 51 of the first planetary transmission mechanism P1 of the planetary transmission section P. The engine force not subjected to any speed change action by the stepless speed change device 10 is taken off via the second input shaft 102 from the pump shaft 11 of the stepless speed change device 11 and inputted via e.g. the transmission shaft 103 to the ring gear 54 of the first planetary transmission mechanism P1 and the carrier 63 of the second planetary transmission mechanism P2 of the planetary transmission section P. The drive force which has been subjected to the speed change action by the stepless speed change device 10 and the drive force which has not been subjected to the speed change action by the stepless speed change device 10 are combined and synthesized by the first planetary transmission mechanism P1, the second planetary transmission mechanism P2, and the third planetary transmission mechanism P3 of the planetary transmission section P. The resultant combined/synthesized drive force from the planetary transmission section P is then transmitted from the clutch section C to the output transmission mechanism 40 and then transmitted from the output shaft 41 to the input shaft 22 of the auxiliary transmission device 20.

That is to say, according to the main speed change device B, as the stepless speed change device 10 is operated for a speed change and each clutch C1, C2 is appropriately switched over into the engaged condition or the disengaged condition, an output with a rotational speed corresponding to the speed change state of the stepless speed change device 10 or the operational condition of the respective clutch C1, C2 will be outputted from the output shaft 41 and this output is transmitted to the input shaft 22 of the auxiliary speed change device 20.

As shown in FIG. 1, the auxiliary speed change device 20 includes a low-speed clutch CL and a high-speed clutch CH having input side rotational members thereof operatively coupled via a rotational transmission member 23 to the input shaft 22, a low speed transmission gear mechanism 24 which operatively couples an output side rotational member of the low-speed clutch CL to the output shaft 21 and a high speed transmission gear mechanism 25 which operatively couples an output side rotational member of the high-speed clutch CH to the output shaft 21.

With the above-described construction, when the low speed clutch CL is operated into the engaged condition, the auxiliary speed change device 20 will be rendered into a low speed condition wherein the output from the output shaft 41 of the main speed change device B is transmitted to the output shaft 21 via the low-speed clutch CL and the low speed transmission gear mechanism 24 and the transmitted from this output shaft 21 to the forward/reverse switchover device 30. Whereas, when the high-speed clutch CH is operated into the engaged condition, the auxiliary speed change device 20 will be rendered into a high speed condition wherein the output from the output shaft 41 of the main speed change device B is transmitted to the output shaft 21 via the high speed clutch CH and the high speed transmission gear mechanism 25 and the transmitted from this output shaft 21 to the forward/reverse switchover device 30. With this auxiliary speed change device 20, the force is transmitted from the input shaft 22 to the output shaft 21 such that even when the rotational speed of the output shaft 41 of the main speed change device B is the same, the device 20, when set under the high speed condition, will cause the output shaft 21 to rotate at a higher speed than under the low speed condition.

Figure 3:
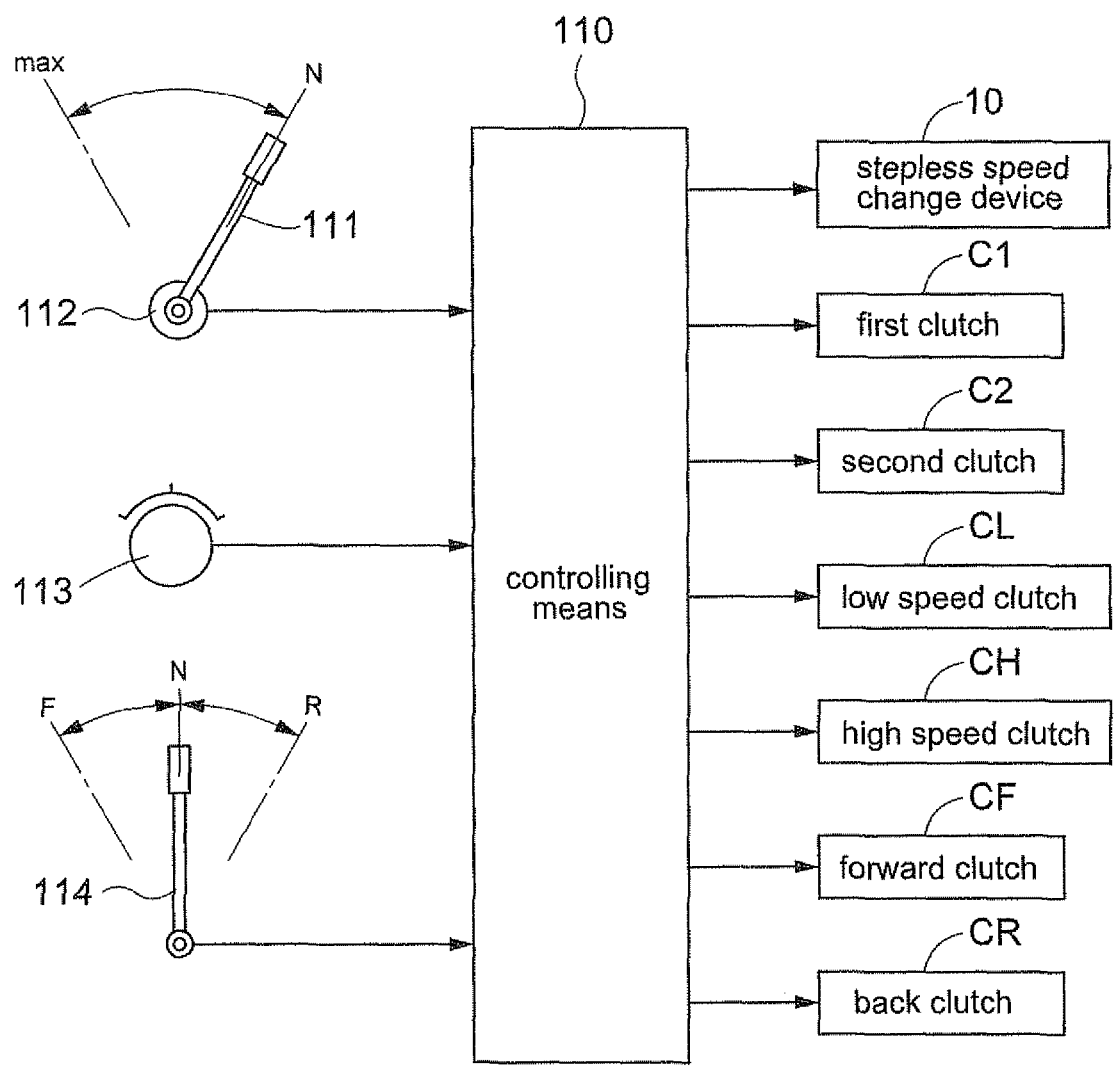
FIG. 3 is a block diagram of speed change control.

As shown in FIG. 3, the stepless speed change device 10, the first clutch C1, the second clutch C2, and the low speed clutch CL and high speed clutch CH of the auxiliary speed change device 20 are operatively connected to a controlling means 110. To this controlling means 110, there are operatively connected a speed change detecting sensor 112 for detecting an operational position of a speed change lever 111 and speed change mode selecting means 113.

The speed change mode selecting means 113 includes a selector switch which can be selectively operated to one of three operational positions of a low speed position, a high speed position and a multiple stage position. When the speed change mode selecting means 113 is operated into the low speed position, a low speed mode instruction will be outputted to the controlling means 110 for executing speed change control by the controlling means 110 under a low speed mode. When the speed change mode selecting means 113 is operated into the high speed position, a high speed mode instruction will be outputted to the controlling means 110 for executing the speed change control by the controlling means 110 under a high speed mode. When the speed change mode selecting means 113 is operated into the multiple stage position, a multiple stage mode instruction will be outputted to the controlling means 110 for executing the speed change control by the controlling means 110 under a multiple stage mode.

The controlling means 110 includes various constitutional elements such as a well-known microcomputer, a memory, a communication means, etc., needed for realizing the various functions described herein. The controlling means 110 effects a speed change operation of the stepless speed change device 107 switchover operations of the first clutch C1 and the second clutch C2 of the clutch section C as well as a speed change operation of the auxiliary speed change device 20, based on detection information from the speed change detecting sensor 112 and an instruction from the speed change mode selecting means 113, such that the auxiliary speed change device 20 may output an drive force of a rotational speed corresponding to the operational position of the speed change lever 111 and the instruction issued from the speed change mode selecting means 113.

Figure 4:
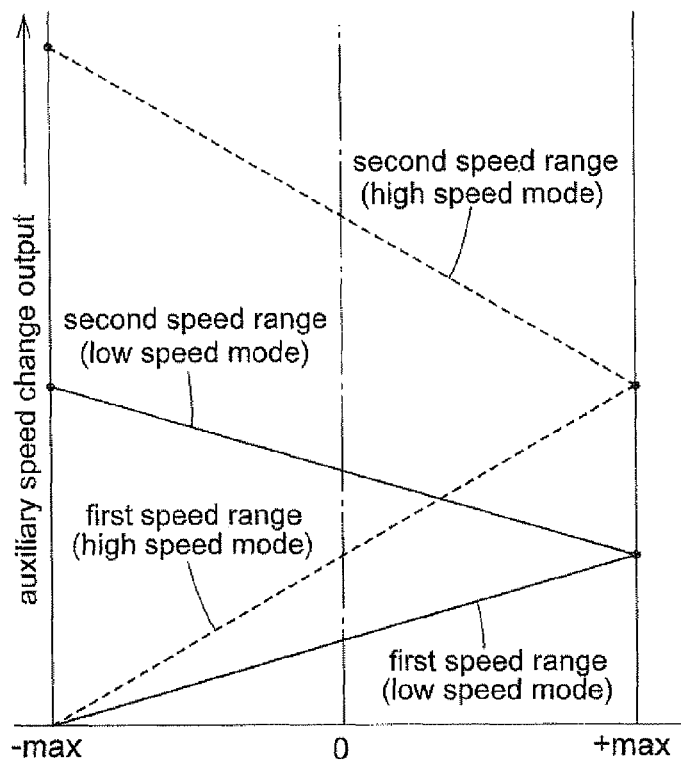
FIG. 4 is an explanatory view illustrating relationship among speed change states of a stepless speed change device in a low speed mode and a high speed mode, speed ranges and auxiliary speed change outputs.

More particularly, if the speed change mode selecting means 113 is operated to the low speed position and then the speed change lever 111 is pivotally operated, as shown in the low speed mode column in FIG. 6, the first clutch C1, the second clutch C2, the low speed clutch CL and the high speed clutch CH will be switched over, so that the auxiliary speed change output will be changed as denoted by the solid line in FIG. 4.

That is, based on a low speed mode instruction from the speed change mode selecting means 113, the controlling means 110 switches over the low speed clutch CL into the engaged condition and switches over the auxiliary speed change device 20 into the low speed condition and fixes the mode to the low speed condition, regardless of change in the position of the speed change lever 111. And, as the speed change lever 111 is operated from a neutral position N toward a maximum speed position (max), based on the detection information from the speed change detecting sensor 112, the controlling means 110 effects a speed change operation of the stepless speed change device 10 from a maximum speed (−max) under the reverse rotational transmission condition (this will be referred to as the maximum reverse rotation condition hereinafter) toward a maximum speed (+max) under the forward rotational transmission condition (this will be referred to as the maximum forward rotation condition hereinafter). In this, the controlling means 110 has operated the first clutch C1 into the engaged condition and the main speed change device B is set to the first speed range. As the stepless speed change device 10 is operated for speed change toward the maximum forward rotation condition, the auxiliary speed change output will be steplessly increased. When the stepless speed change device 10 reaches the maximum forward rotation condition, thereafter, based on the detection information from the speed change detecting sensor 112, the controlling means 110 operates the stepless speed change device 110 from the maximum forward rotation condition toward the maximum reverse rotation condition. In this, the controlling means 110 has operated the second clutch C2 into the engaged condition and the main speed change device B is set to the second speed range. As the stepless speed change device 10 is operated for speed change toward the maximum reverse rotation condition, the auxiliary speed change output will be steplessly increased.

If the speed change mode selecting means 113 is operated to the high speed position and then the speed change lever 111 is pivotally operated, as shown in the high speed mode column in FIG. 6, the first clutch C1, the second clutch C2, the low speed clutch CL and the high speed clutch CH will be switched over, so that the auxiliary speed change output will be changed as denoted by the broken line in FIG. 4.

That is, based on a high speed mode instruction from the speed change mode selecting means 113, the controlling means 110 switches over the high speed clutch CL into the engaged condition and switches over the auxiliary speed change device 20 into the high speed condition and fixes the mode to the high speed condition, regardless of change in the position of the speed change lever 111. And, as the speed change lever 111 is operated from the neutral position N toward the maximum speed position (max), based on the detection information from the speed change detecting sensor 112, the controlling means 110 effects a speed change operation of the stepless speed change device 10 from the maximum reverse rotation toward the maximum forward rotation condition. In this, the controlling means 110 has operated the first clutch C1 into the engaged condition and the main speed change device B is set to the first speed range. As the stepless speed change device 10 is operated for speed change toward the maximum forward rotation condition, the auxiliary speed change output will be steplessly increased. When the stepless speed change device 10 reaches the maximum forward rotation condition, thereafter, based on the detection information from the speed change detecting sensor 112, the controlling means 110 operates the stepless speed change device 110 from the maximum forward rotation condition toward the maximum reverse rotation condition. In this, the controlling means 110 has operated the second clutch C2 into the engaged condition and the main speed change device B is set to the second speed range. As the stepless speed change device 10 is operated for speed change toward the maximum reverse rotation condition, the auxiliary speed change output will be steplessly increased.

In this high speed mode, the auxiliary speed change device 20 is fixed to the high speed condition. So, whether the main speed change device B is set to the first speed range or the second speed range, the auxiliary speed change output will be of a higher speed than in the low speed mode.

Figure 5:
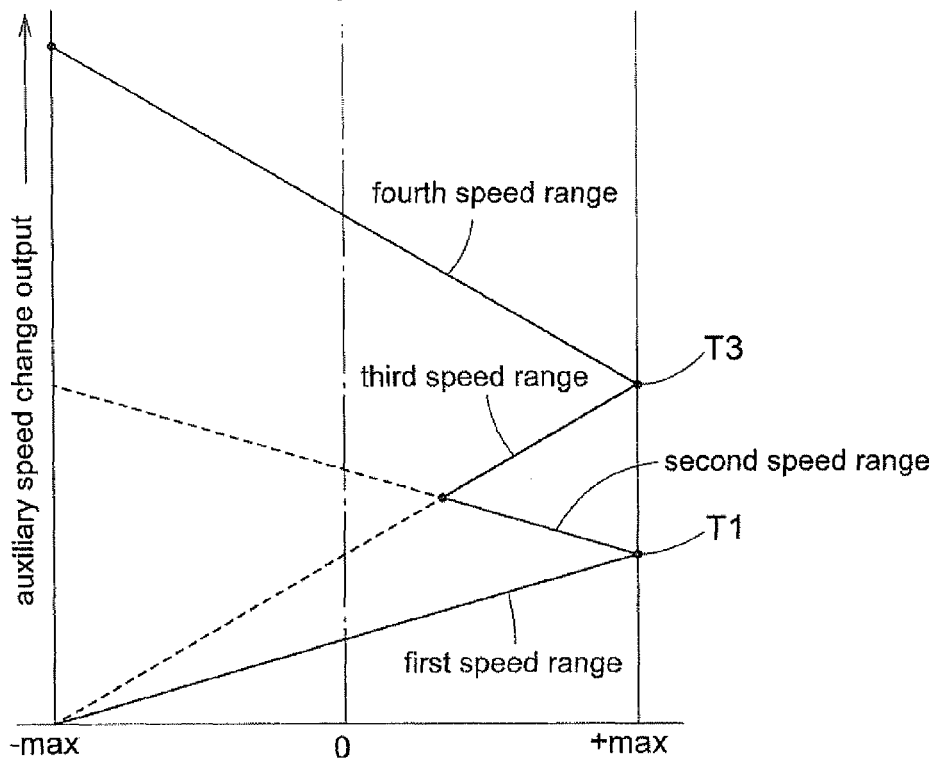
FIG. 5 is an explanatory view illustrating relationship among speed change states of a stepless speed change device in a multiple stage mode, speed ranges and auxiliary speed change outputs.

If the speed change mode selecting means 113 is operated to the multiple stage position and then the speed change lever 111 is pivotally operated, as shown in the multiple stage mode column in FIG. 6, the first clutch C1, the second clutch C2, the low speed clutch CL and the high speed clutch CH will be switched over, so that the auxiliary speed change output will be changed as shown in FIG. 5.

That is, as the speed change lever 111 is operated from the neutral position N toward the maximum speed position (max), based on the detection information from the speed change detecting sensor 112, the controlling means 110 effects a speed change operation of the stepless speed change device 10 from the maximum reverse rotation toward the maximum forward rotation condition. In this, the controlling means 110 has operated the first clutch C1 into the engaged condition and the main speed change device B is set to the first speed range. As the stepless speed change device 10 is operated for speed change toward the maximum forward rotation condition, the auxiliary speed change output will be steplessly increased. When the stepless speed change device 10 reaches the maximum forward rotation condition and reaches a speed range switchover point T1, thereafter, based on the detection information from the speed change detecting sensor 112, the controlling means 110 operates the stepless speed change device 10 from the maximum forward rotation condition toward the maximum reverse rotation condition. In this, the controlling means 110 has operated the second clutch C2 into the engaged condition and the main speed change device B is set to the second speed range. As the stepless speed change device 10 is operated for speed change toward the maximum reverse rotation condition, the auxiliary speed change output will be steplessly increased. When the speed change lever 111 has reached a set position and a speed range switchover point T2 is reached, thereafter, based on the detection information from the speed change detecting sensor 112, the controlling means 110 switches over the low speed clutch CL into the disengaged condition and switches over the high speed clutch CH into the engaged condition, respectively and operates also the stepless speed change device 10 toward the maximum forward rotation condition. In this, the controlling means 110 has operated the first clutch C1 into the engaged condition and the second clutch C2 into the disengaged condition, respectively and the main speed change device B is set to the third speed range. As the stepless speed change device 10 is operated for speed change toward the maximum forward rotation condition, the auxiliary speed change output will be steplessly increased. When the speed change lever 111 has reached a set position and a speed range switchover point T3 is reached, thereafter, based on the detection information from the speed change detecting sensor 112, the controlling means 110 switches over the high speed clutch CH into the engaged condition and switches over also the stepless speed change device 10 from the maximum forward rotation condition toward the maximum reverse rotation condition. In this, the controlling means 110 has operated the second clutch C2 into the engaged condition and the main speed change device B is set to the fourth speed range. As the stepless speed change device 10 is operated for speed change toward the maximum reverse rotation condition, the auxiliary speed change output will be steplessly increased.

Incidentally, the controlling means 110 detects the speed range switchover points T1, T2 and TS, based on the detection information from the speed change detecting sensor 112, detection information from an output detecting sensor (not shown) for detecting an output speed of the auxiliary speed change device 20, and detection information from an engine rotation sensor (not shown) for detecting an engine rotational speed.

More particularly, FIG. 4 and FIG. 5 show relationship between auxiliary speed change outputs realized by effecting change speed operations with keeping the engine rotational speed at a predetermined rotational speed and operational conditions of the stepless speed change device 10. When the set rotational speed of the engine 1 is changed, this will result, as an auxiliary speed change output realized thereby, in change in the entire auxiliary speed change output represented by the vertical axes in FIG. 4 and FIG. 5. Accordingly, the controlling means 110 is configured to obtain a speed change ratio, based on an output speed detected by the output detecting sensor for detecting an output speed of the auxiliary speed change device 20 and the engine rotation speed detected by the engine rotation sensor for detecting the engine rotation speed and to effect switchover operations of the low speed clutch CL and the high speed clutch CH of the auxiliary speed change device 20 when this speed change ratio reaches a speed change ratio corresponding to the speed range switchover point T2.

Further, based on detection information from a swash plate slope sensor (not shown) for detecting a swash plate slope of the stepless speed change device 10, the controlling means 110 detects the maximum speed position (+max) and the minimum speed position (−max) of the stepless speed change device 10 and detects the speed range switchover points T1, T3.

As shown in FIG. 5, from the auxiliary speed change device 20, there is outputted a continuous output without torque interruption, at all of the switchover point T1 between the first speed range and the second speed range, the switchover point T2 between the second speed range and the third speed range and the switchover point T3 between the third speed range and the fourth speed range.

Incidentally, the sign "ENGAGED" shown in FIG. 6 represents the engaged condition of the respective clutches C1, C2, CL, CH and the sign "−" represents the disengaged condition of the respective clutches C1, C2, CL, CH. The sign "0" on the horizontal axes shown in FIG. 4 and FIG. 5 represents the neutral condition of the stepless speed change device 10.

As shown in FIG. 1, the forward/reverse switchover device 30 includes a forward clutch CF having an input side rotational member thereof coupled to the input shaft 31 to be rotatable therewith, a reverse gear mechanism 34 having an input gear 33 coupled to the input shaft 31 to be rotatable therewith, a reverse clutch CR having an input side rotational member thereof coupled to an output gear 35 of the reverse gear mechanism 34 to be rotatable therewith, and the output shaft 32 coupled via a rotational transmission member 36 to output side rotational members of the forward clutch CF and the reverse clutch CR to be rotatable therewith.

That is, with this forward/reverse switchover device 30 in operation, when the forward clutch CF is switched over into the engaged condition, the output from the auxiliary speed change device 20 is converted into a forward propelling force and transmitted as such from the output shaft 32 to the rear wheel differential mechanism 3 and the front wheel differential mechanism 6. Whereas, when the reverse clutch CR is switched over into the engaged condition, the output from the auxiliary speed change device 20 is converted into a reverse propelling force and transmitted as such from the output shaft 32 to the rear wheel differential mechanism 3 and the front wheel differential mechanism 6.

Further, with this forward/reverse switchover device 30, as shown in FIG. 3, in response to a switchover operation of a forward/reverse lever 114 operatively connected to the controlling means 110 to a forward position F or a reverse position R, the forward clutch CF or the reverse clutch OR is switched over by the controlling means 110 to provide a forward traveling condition or a reverse traveling condition. Further, when the forward/reverse lever 114 is operated to the neutral position N, both the forward clutch CF and the reverse clutch CR are operated into the disengaged conditions, thus realizing a neutral condition for stopping any force transmission.

Referring to the main speed change device B in greater details, the planetary transmission section P and the clutch section C of this main speed change device B are constructed as shown in FIG. 2.

A transmission case 120 accommodates therein the transmission shaft 103 rotatably supported to a pair of support portions 121 of the transmission case 120, a support cylinder 122 rotatably fitted on the transmission shaft 103 and juxtaposed along the axis of this transmission shaft 103, the transmission cylinder shaft 105 and the transmission rotational member 44. The sun gear 51 of the first planetary transmission mechanism P1 is supported and coupled to the support cylinder 122 with spline engagement to be rotatable therewith. The carrier 53 of the first planetary transmission mechanism P1 is rotatably supported to the support cylinder 122 via a bearing 123. A transmission gear 124 is formed continuously with the support cylinder 122 to be rotatable therewith. A transmission gear 125 meshing with this transmission gear 124 is provided on the first input shaft 101 to be rotatable therewith. In operation, the drive force outputted from the motor shaft 12 of the stepless speed change device 10 and inputted via the first input shaft 101 to the transmission case 120 is inputted via the transmission gears 125, 124 and the support cylinder 122 to the sun gear 51 of the first planetary transmission mechanism P1.

The carrier 63 of the second planetary transmission mechanism P2 is supported by spline engagement to the transmission shaft 103 between the support cylinder 122 and the transmission cylinder 105 to be rotatable therewith. At an end of the transmission shaft 103, there is mounted a transmission gear 126 via spline engagement to be rotatable therewith. A transmission gear 127 meshing with this transmission gear 126 is provided on the second input shaft 102 to be rotatable therewith. In operation, the engine drive force taken off by the second input shaft 102 from the pump shaft 11 of the stepless speed change device 10 is transmitted via the transmission gears 127, 126 and the transmission shaft 103 and inputted to the carrier 63 of the second planetary transmission mechanism P2 and the ring gear 54 of the first planetary transmission mechanism P1.

The output side rotational member 82 of the first clutch C1 and the output side rotational member 92 of the second clutch C2 are formed integral to be a single component. The output side rotational members 82, 92 of the first clutch C1 and the second clutch C2 are rotatably supported to the transmission cylinder shaft 105 via an attaching cylindrical portion 128 formed continuously within the output side rotational members 82, 92. The input side rotational member 91 of the first clutch C1 and the input side rotational member 91 of the second clutch C2 are juxtaposed along the direction of the axis of the transmission shaft 103 and distributed inside the output side rotational member 92 of the first clutch C1 and inside the output side rotational member 92 of the second clutch C2. The input side rotational member 81 of the first clutch C1 is rotatably supported to the transmission cylinder shaft 105 via a bearing 129. One end portion of the disc-like coupling member 106 disposed so as to extend between the first clutch C1 and the third planetary transmission mechanism P3 is coupled to the ring gear 74 of the third planetary transmission mechanism P3 and the other end portion of the coupling member 106 is coupled to the input side rotational member 81 of the first clutch C1. The input side rotational member 81 of the first clutch C1 is coupled via the coupling member 106 to the ring gear 74 of the third planetary transmission mechanism P3 to be rotatable therewith.

The input side rotational member 91 of the second clutch C2 is supported and coupled via spline engagement to an end portion of the transmission cylinder shaft 105 to be rotatable therewith. The sun gear 61 of the second planetary transmission mechanism P2 is coupled via spline engagement to an end of the transmission cylinder shaft 105 to be rotatable therewith. The sun gear 71 of the third planetary transmission mechanism P3 is formed integral at an intermediate portion of the transmission cylinder shaft 105. The input side rotational member 91 of the second clutch C2 is coupled via the transmission cylinder shaft 105 to the sun gear 61 of the second planetary transmission mechanism P2 and the sun gear 71 of the third planetary transmission mechanism P3, respectively to be rotatable therewith.

The output side rotational member 82 of the first clutch C1 and the output side rotational member 92 of the second clutch C2 are formed integral to be a single component. At an end portion of the output side rotational member 92 of the second clutch C2, there is provided a retaining coupling portion 130 having engaging recesses 130a located at a plurality of positions in the peripheral direction of this output side rotational member 92, and an inner peripheral side of the disc-like transmission member 45 configured to have its outer peripheral side engaged via engaging pawls with the respective engaging recesses 130a of this retaining coupling portion 130 is coupled via spline engagement to one end side of the transmission rotational member 44. The output side rotational members 82, 92 of the first clutch C1 and the second clutch C2 are coupled via the transmission member 45 to the transmission rotational member 44 to be rotatable therewith, thus being operatively coupled to the output shaft 41.

Each one of the first clutch C1 and the second clutch C2 is constructed as a hydraulic clutch which is switched over into the engaged condition or the disengaged condition by means of hydraulic pistons 84, 94 provided within the output side rotational members 82, 92. To/from the respective hydraulic piston 84, 94 of the respective clutches C1, C2, oil pressure is fed or discharged via the attaching cylindrical portion 128 of the output side rotational members 92, 92, the transmission cylinder shaft 105, and an operational oil path 131 defined in the transmission shaft 103, whereby the first and second clutches C1, C2 are switched over.

Figure 7:
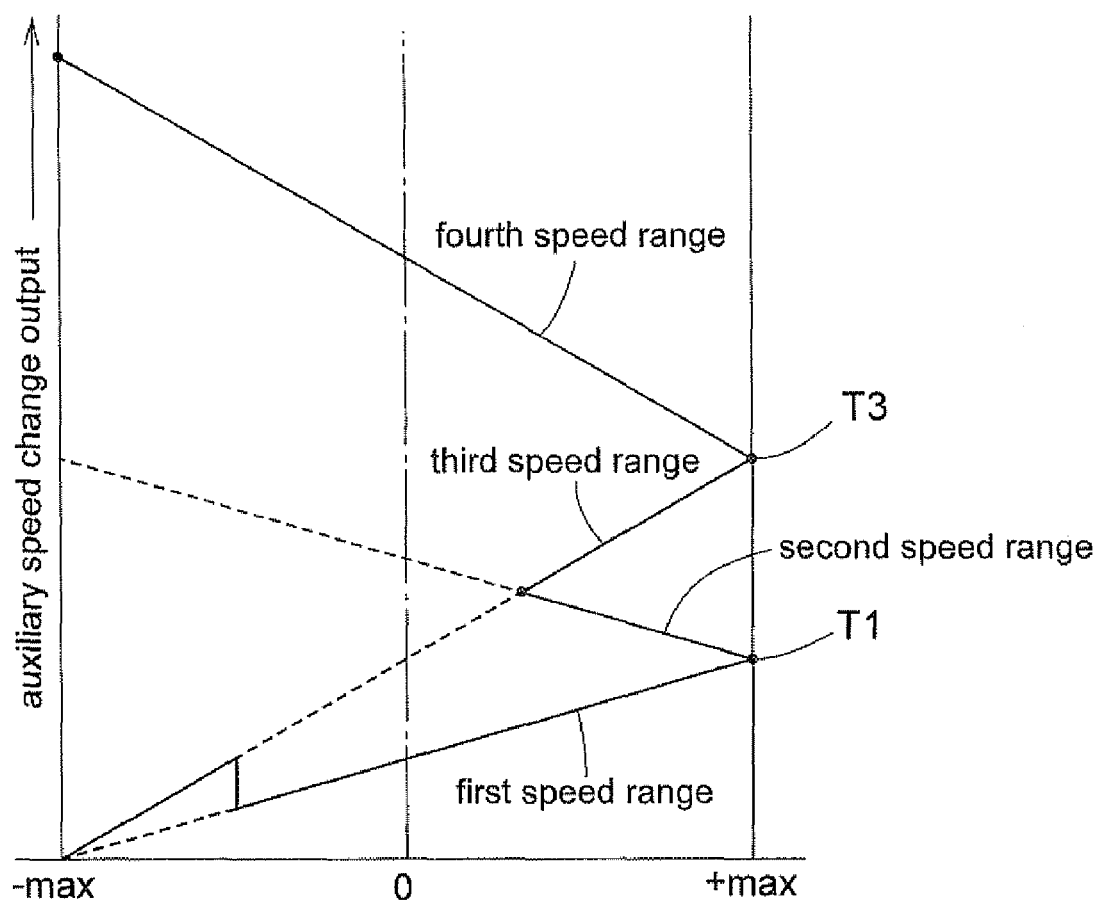
FIG. 7 is an explanatory view illustrating relationship among speed change states of a stepless speed change device in a multiple stage mode, speed ranges and auxiliary speed change outputs, with a speed change transmission apparatus having a construction of a further embodiment.

FIG. 7 illustrates relationship among the speed ranges of the main speed change device B of the speed change transmission apparatus having a different multiple stage speed change mode, speed change states of the stepless speed change device 10 and auxiliary speed change outputs. This multiple stage speed change mode differs only in the low speed side in the first speed range from the multiple stage speed mode illustrated in FIG. 5.

More particularly, on the low speed side in the first speed range, as the high speed clutch CH is switched over into the engaged condition, the auxiliary speed change device 20 is operated into the high speed condition, whereby a relatively high speed auxiliary speed change output is provided.

Other Embodiments

As the auxiliary speed change device 20, it is possible to employ a device having three speed positions. In this case, it becomes possible to provide six speed ranges. Similarly, as the auxiliary speed change device 20, it is possible to employ a device having four speed positions. In this case, it becomes possible to provide eight speed ranges.

As the planetary transmission section P of the main speed change device B, instead of the one described in the foregoing embodiment which includes three planetary transmission mechanisms, i.e. the first, second and third planetary transmission mechanisms P1, P2, P3, the invention may be embodied by using a planetary transmission section which is constructed as follows.

Namely, this planetary transmission section includes:

a first planetary transmission mechanism disposed on the transmission-wise upstream side so as to receive the output from the stepless speed change device and the engine drive force not subjected to any speed change action by the stepless speed change device;

a second planetary transmission mechanism disposed on the transmission-wise downstream side so as to transmit force to the clutch section;

a coupling planet gear coupled to or formed integral with a planet gear of the first planetary transmission mechanism to be rotatable therewith;

a coupling planet gear coupled to or formed integral with a planet gear of the second planetary transmission mechanism to be rotatable therewith;

the two coupling planet gears being provided between the first planetary transmission mechanism and the second planetary transmission mechanism so be meshed with each other and supported to one carrier. That is to say, the invention may be embodied with adopting such planetary transmission section having two planetary transmission mechanisms being combined via coupling planet gears with each other.

The object of the present invention can be achieved with using either type of planetary transmission section. For this reason, these planetary transmission sections are generically referred to as the planetary transmission section P configured to combine an output from the stepless speed change device 10 and the engine drive force.

Industrial Applicability

The speed change transmission apparatus according to the present invention may be used in a work vehicle such as a tractor.

The invention claimed is:
1. A speed change transmission apparatus comprising
a main speed change device, said main speed change device including;
a stepless speed change device receiving a drive force from an engine;
a planetary transmission section including a plurality of planetary transmission mechanisms, said planetary transmission section being configured to combine an output from said stepless speed change device and drive force from the engine not subjected to a speed change action by said stepless speed change device;
a clutch section receiving force from said planetary transmission section and including a first clutch and a second clutch; and
an output shaft operatively coupled to said clutch section, wherein, in response to a speed change operation on said stepless speed change device and to a switchover operation of each of said clutches between an engaged condition and a disengaged condition, said main speed change device outputs, from said output shaft, an output with a rotational speed corresponding to a speed change state of said stepless speed change device and operational conditions of said respective first or second clutch; and
an auxiliary speed change device for changing speed of the drive force from said output shaft of said main speed change device and outputting the resultant speed-changed drive force.

2. The speed change transmission apparatus according to claim 1, wherein;
the main speed change device further includes a transmission cylinder shaft with a transmission shaft extending within said transmission cylinder shaft such that the transmission cylinder shaft is rotatable with respect to the transmission shaft, said transmission shaft transmitting the engine drive force not subjected to the speed change action by the stepless speed change device to said planetary transmission section; wherein
said transmission cylinder shaft supports a sun gear of one of said plurality of planetary transmission mechanisms arranged on a transmission downstream side of the planetary transmission section and an input side rotational member of said second clutch so that said sun gear and said input side rotational member are rotatable with the transmission cylinder shaft;
an input side rotational member of said first clutch and the input side rotational member of said second clutch are rotatably supported to said transmission cylindrical shaft and juxtaposed along an axis of said transmission shaft; and
a coupling member for operatively coupling a ring gear of the planetary transmission mechanism on the transmission downstream side of the planetary transmission section to the input side rotational member of the first clutch is disposed between said first clutch and said planetary transmission section.

3. The speed change transmission apparatus according to claim 2, wherein;
there is provided an output transmission rotational member having said transmission shaft extending therethrough such that said output transmission rotational member is rotatable with respect to said transmission shaft; wherein
an output side rotational member of said first clutch and an output side rotational member of said second clutch are formed integral with each other; and
there is provided a transmission member having one end portion thereof retained to a retaining coupling portion of the output side rotational member of the second clutch to be rotatable therewith and having the other end portion thereof operatively coupled to said transmission rotational member, thereby operatively coupling the output side rotational members of the first and second clutches to said transmission rotational member.

4. The speed change transmission apparatus according to claim 3, wherein;
with a speed change operation of the stepless speed change device, a switchover operation of the first and second clutches and a speed change operation of the auxiliary speed change device, there are provided four speed ranges and wherein the auxiliary speed change device outputs an output which is continuous between the speed ranges and is speed-changed steplessly in each speed range.

5. The speed change transmission apparatus according to claim 2, wherein;
with a speed change operation of the stepless speed change device, a switchover operation of the first and second clutches and a speed change operation of the auxiliary speed change device, there are provided four speed ranges and wherein the auxiliary speed change device outputs an output which is continuous between the speed ranges and is speed-changed steplessly in each speed range.

6. The speed change transmission apparatus according to claim 1, wherein;
with a speed change operation of the stepless speed change device, a switchover operation of the first and second clutches and a speed change operation of the auxiliary speed change device, there are provided four speed ranges and wherein the auxiliary speed change device outputs an output which is continuous between the speed ranges and is speed-changed steplessly in each speed range.

* * * * *